(12) United States Patent
Miller et al.

(10) Patent No.: US 11,372,874 B2
(45) Date of Patent: *Jun. 28, 2022

(54) SYSTEMS AND METHODS FOR DISPLAYING ESTIMATED RELEVANCE INDICATORS FOR RESULT SETS OF DOCUMENTS AND FOR DISPLAYING QUERY VISUALIZATIONS

(71) Applicant: LexisNexis, a division of Reed Elsevier Inc., Miamisburg, OH (US)

(72) Inventors: Richard D. Miller, Yellow Springs, OH (US); Jacob Aaron Myers, Dayton, OH (US); Travis Shane Ritchie, Bloomington, IN (US); Todd J. Frascone, Donnelsville, OH (US)

(73) Assignee: RELX INC., Miamisburg, OH (US)

(*) Notice: Subject to any disclaimer, the term of this patent is extended or adjusted under 35 U.S.C. 154(b) by 255 days.

This patent is subject to a terminal disclaimer.

(21) Appl. No.: 16/290,509

(22) Filed: Mar. 1, 2019

(65) Prior Publication Data

US 2019/0197036 A1    Jun. 27, 2019

Related U.S. Application Data

(60) Division of application No. 15/450,092, filed on Mar. 6, 2017, now Pat. No. 10,268,738, which is a
(Continued)

(51) Int. Cl.
*G06F 7/00*    (2006.01)
*G06F 16/00*    (2019.01)
(Continued)

(52) U.S. Cl.
CPC ...... *G06F 16/248* (2019.01); *G06F 16/24578* (2019.01); *G06F 16/3322* (2019.01);
(Continued)

(58) Field of Classification Search
None
See application file for complete search history.

(56) References Cited

U.S. PATENT DOCUMENTS

| 6,094,652 A | 7/2000 | Faisal |
| 6,223,145 B1 | 4/2001 | Hearst |

(Continued)

FOREIGN PATENT DOCUMENTS

| EP | 1890243 A2 | 2/2008 |
| JP | 2007-219722 A | 8/2007 |

(Continued)

OTHER PUBLICATIONS

Australian Examination Report No. 2 dated Jan. 28, 2020 in related Australian Patent Application No. 2015253062 (6 pages total).

(Continued)

*Primary Examiner* — Tuan A Pham
(74) *Attorney, Agent, or Firm* — Dinsmore & Shohl LLP

(57) ABSTRACT

Systems and methods for displaying estimated relevance indicators for result sets of documents and for displaying query visualizations are disclosed. A method includes receiving a search query including a plurality of query terms. The method further includes searching a database using the search query to identify the result set of documents and calculating an estimated relevance score for the result set of documents. The estimated relevance score is indicative of a degree to which the result set of documents are relevant to the search query. The method further includes providing for display the estimated relevance indicator based on the estimated relevance score. The estimated relevance indicator provides a visual indication of the degree to which the result set of documents are relevant to the search query. Query visualizations including a plurality of nodes and a plurality of connectors are also disclosed.

14 Claims, 8 Drawing Sheets

Related U.S. Application Data continuation of application No. 14/267,340, filed on May 1, 2014, now Pat. No. 9,626,455.

(51) Int. Cl.

| | | |
|---|---|---|
| *G06F 16/248* | (2019.01) | |
| *G06F 16/93* | (2019.01) | |
| *G06F 16/951* | (2019.01) | |
| *G06F 16/332* | (2019.01) | |
| *G06F 16/9038* | (2019.01) | |
| *G06F 16/2457* | (2019.01) | |
| *G06F 16/9032* | (2019.01) | |

(52) U.S. Cl.
CPC .... *G06F 16/9038* (2019.01); *G06F 16/90324* (2019.01); *G06F 16/93* (2019.01); *G06F 16/951* (2019.01)

(56) References Cited

U.S. PATENT DOCUMENTS

| | | | |
|---|---|---|---|
| 6,363,377 | B1 | 3/2002 | Kravets et al. |
| 7,444,348 | B2 | 10/2008 | Fries et al. |
| 8,280,900 | B2 | 10/2012 | Pickens et al. |
| 8,849,817 | B1 | 9/2014 | Mysen et al. |
| 8,965,872 | B2 | 2/2015 | Hsu et al. |
| 2003/0225755 | A1 | 12/2003 | Iwayama et al. |
| 2005/0091209 | A1 | 4/2005 | Frank et al. |
| 2005/0154718 | A1 | 7/2005 | Payne et al. |
| 2007/0185863 | A1 | 8/2007 | Budzik et al. |
| 2008/0021860 | A1 | 1/2008 | Wiegering et al. |
| 2008/0275868 | A1 | 11/2008 | Zer |
| 2009/0006382 | A1 | 1/2009 | Tunkelang et al. |
| 2009/0327224 | A1 | 12/2009 | White et al. |
| 2009/0327279 | A1 | 12/2009 | Adachi et al. |
| 2010/0211924 | A1* | 8/2010 | Begel ............. G06F 16/9024 717/101 |
| 2010/0268710 | A1 | 10/2010 | Strehl et al. |
| 2011/0106819 | A1* | 5/2011 | Brown ............. G06F 16/367 707/749 |
| 2011/0106831 | A1 | 5/2011 | Zarzar Charur et al. |
| 2011/0131241 | A1 | 6/2011 | Petrou et al. |
| 2012/0016875 | A1* | 1/2012 | Jin ................. G06F 16/9535 707/734 |
| 2012/0191705 | A1 | 7/2012 | Tong et al. |
| 2012/0254076 | A1 | 10/2012 | Yang et al. |
| 2012/0278321 | A1* | 11/2012 | Traub ............. G06F 16/3331 707/736 |
| 2012/0330946 | A1* | 12/2012 | Arredondo ...... G06F 16/24575 707/728 |
| 2014/0114962 | A1 | 4/2014 | Rosenburg et al. |
| 2014/0156681 | A1 | 6/2014 | Lee et al. |
| 2014/0207746 | A1 | 7/2014 | Song et al. |
| 2015/0242512 | A1 | 8/2015 | Lindahl et al. |
| 2015/0317320 | A1 | 11/2015 | Miller et al. |

FOREIGN PATENT DOCUMENTS

| | | |
|---|---|---|
| JP | 2010-009251 A | 1/2010 |
| WO | 0237328 A2 | 5/2002 |

OTHER PUBLICATIONS

Summons to attend oral proceedings pursuant to Rule 115(1) EPC dated Jun. 10, 2020 in European Application No. 15786346.5, 12 pages.

Kruschwitz et al., "Deriving query suggestions for site search", Journal of the American Society for Information Science and Technology, vol. 64, No. 10, Nov. 27, 2012, pp. 1975-1994.

International Search Report & Written Opinion relating to PCT/US2015/028500 filed Apr. 30, 2015; dated Jul. 28, 2015. pp. 1-13.

Office Action relating to U.S. Appl. No. 14/267,340; dated Feb. 22, 2016.

Office Action relating to U.S. Appl. No. 14/267,340; dated Aug. 2, 2016.

Notice of Allowance relating to U.S. Appl. No. 14/267,340; dated Dec. 29, 2016.

Extended European Search Report, dated Aug. 4, 2017, in European Patent Application No. 15786346.5 (8 pages).

* cited by examiner

SYSTEMS AND METHODS FOR DISPLAYING ESTIMATED RELEVANCE INDICATORS FOR RESULT SETS OF DOCUMENTS AND FOR DISPLAYING QUERY VISUALIZATIONS

CROSS-REFERENCE TO RELATED APPLICATION

This application is a divisional of U.S. patent application Ser. No. 15/450,092 filed Mar. 6, 2017, which is a continuation of U.S. patent application Ser. No. 14/267,340 filed on May 1, 2014.

BACKGROUND

Field

The present specification generally relates to search queries and, more particularly, to systems and methods for calculating estimated relevance scores of result sets of documents and for displaying estimated relevance indicators for result sets of documents based on the calculated estimated relevance scores, and to systems and methods for displaying query visualizations.

Technical Background

Users construct search queries to search document databases (e.g., legal document databases, patent document databases, news article document databases, financial document databases, etc.) in order to identify documents that satisfy a search objective. There is a risk that users may construct ineffective search queries that yield unsatisfactory result sets that do not satisfy the user's search objective. A user may make poor or uninformed conclusions or decisions by erroneously relying on unreliable search results. A user may also waste significant time reviewing unsatisfactory results, which may not even include the documents that are most relevant to the user's search objective. A user may have no idea as to the relevance or usefulness of a set of documents identified by a search query until the user spends a significant amount of time and effort reviewing the documents. Furthermore, it may be desirable to visualize and manipulate a search query in an intuitive and user friendly manner.

Accordingly, a need exists for systems and methods for displaying estimated relevance indicators for result sets of documents and systems and methods for displaying query visualizations.

SUMMARY

In one embodiment, a method for providing for display an estimated relevance indicator for a result set of documents includes receiving, at a computer, a search query including a plurality of query terms. The method further includes searching a database using the search query to identify the result set of documents. The result set of documents are identified based on the search query. The method further includes calculating an estimated relevance score for the result set of documents. The estimated relevance score is indicative of a degree to which the result set of documents are relevant to the search query. The method further includes providing for display the estimated relevance indicator based on the estimated relevance score. The estimated relevance indicator provides a visual indication of the degree to which the result set of documents are relevant to the search query.

In another embodiment, a method for providing for display an estimated relevance indicator for a result set of documents includes receiving, at a computer, the search query. The search query includes a plurality of query terms. The method further includes searching a database using the search query to identify a result set of documents. The result set of documents are identified based on the search query. The method further includes calculating an estimated relevance score for the result set of documents. The estimated relevance score is indicative of a degree to which the result set of documents are relevant to the search query. The method further includes providing for display an estimated relevance indicator based on the estimated relevance score. The estimated relevance indicator provides a visual indication of the degree to which the result set of documents are relevant to the search query. The method further includes determining that the estimated relevance score is less than a relevance score threshold and providing at least one suggestion for improving the search query in response to determining that the estimated relevance score is less than the relevance score threshold.

In yet another embodiment, a method for displaying a visualization of a search query includes providing for display a graphical user interface having a query input element. The method further includes receiving a search query entered into the query input element. The search query includes a plurality of query terms. The method further includes providing for display on the graphical user interface a query visualization and manipulation element including a plurality of nodes and a plurality of connectors. The plurality of nodes correspond to the plurality of query terms. Each connector of the plurality of connectors connects a pair of the plurality of nodes and is representative of a proximity of the corresponding query terms of the connected pair of nodes.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
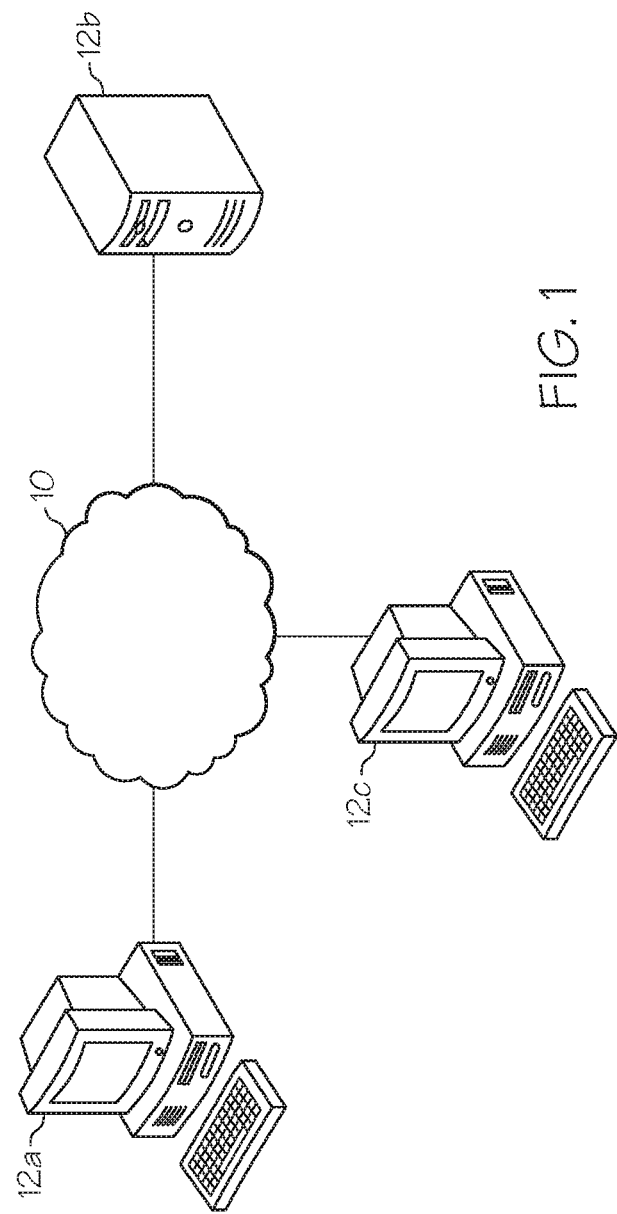
FIG. 1 depicts a schematic illustration of a computing network for a system for performing the functions described herein, according to one or more embodiments shown and described herein.

Referring generally to the figures, embodiments described herein are directed to systems and methods for calculating estimated relevance scores of result sets of documents that are identified based on a search query and to systems and methods for displaying query visualizations. Some embodiments of the systems and methods described herein also display estimated relevance indicators for result sets of documents based on the calculated estimated relevance scores. The displayed estimated relevance indicator provides a visual indication of the degree to which the result set of documents are relevant to the search query. Providing a visual indication of the degree to which a result set of document is relevant to a search query may allow a user to formulate improved queries, inspect more relevant documents, and save time by reducing the amount of time spent inspecting irrelevant documents. For example, by providing a visual indication that a result set of documents is estimated as of low relevance, the embodiments described herein may alert a user that the result set is not relevant and that the user should not waste time inspecting irrelevant results. Conversely, by providing a visual indication that a result set of documents is estimated as of high relevance, the embodiments described herein may alert a user that the result set is likely relevant and that the user can proceed with inspection of the result set with confidence that wasted time will be reduced. Additionally, providing a visual indication that a result set of documents is estimated as of high relevance may signal that improvement of the search query is not required since the results will likely be satisfactory to the user's search objective, while providing a visual indication that a result set of documents is estimated as of low relevance may signal that improvement of the search query is needed before inspecting the documents in the result set. In some embodiments, at least one suggestion for improving a search query is provided when the estimated relevance score is less than a relevance score threshold. Some embodiments provide for display a graphical user interface including a query input element, a query visualization and manipulation element, an estimated relevance element, and a results feedback element.

Furthermore, the displayed query visualizations described herein may facilitate the visualization and manipulation of a search query in an intuitive and user friendly manner. Various embodiments of systems and methods for calculating estimated relevance scores of result sets of documents, for displaying estimated relevance indicators for result sets of documents, and for displaying query visualizations are described below.

Although the embodiments are described herein in the context of a document database including legal documents (e.g., cases, statutes, etc.), patent documents, news documents, financial documents, and the like, it should be understood that embodiments are not limited thereto.

Referring now to the drawings, FIG. 1 depicts an exemplary computing network, illustrating components for a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to facilitate searching of a document database, display and receive input from a graphical user interface used to perform such searching, and display a result set of documents and information pertaining to the result set of documents (e.g., an estimated relevance indicator indicative of the degree to which the result set of documents are relevant to a search query). The user computing device 12a may also facilitate the improvement of a search query by receiving and transmitting user input in response receiving and displaying suggestions for improving the search query from the server computing device 12b. The user computing device 12a may also be utilized to perform other user functions.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into the document database.

The server computing device 12b may receive a search query from the user computing device 12a and search a document database using the search query to identify a result set of documents. The server computing device 12b may also calculated an estimated relevance score for the result set of documents that is indicative of a degree to which the result set of documents are relevant to a search query. The server computing device 12b may also transmit information to the user computing device 12a such that the user computing device 12a may display the result set of documents and information pertaining to the result set of documents, such as an estimated relevance indicator. The components and functionality of the server computing device 12b will be set forth in detail below.

It should be understood that while the user computing device 12a and the administrator computing device 12c are depicted as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
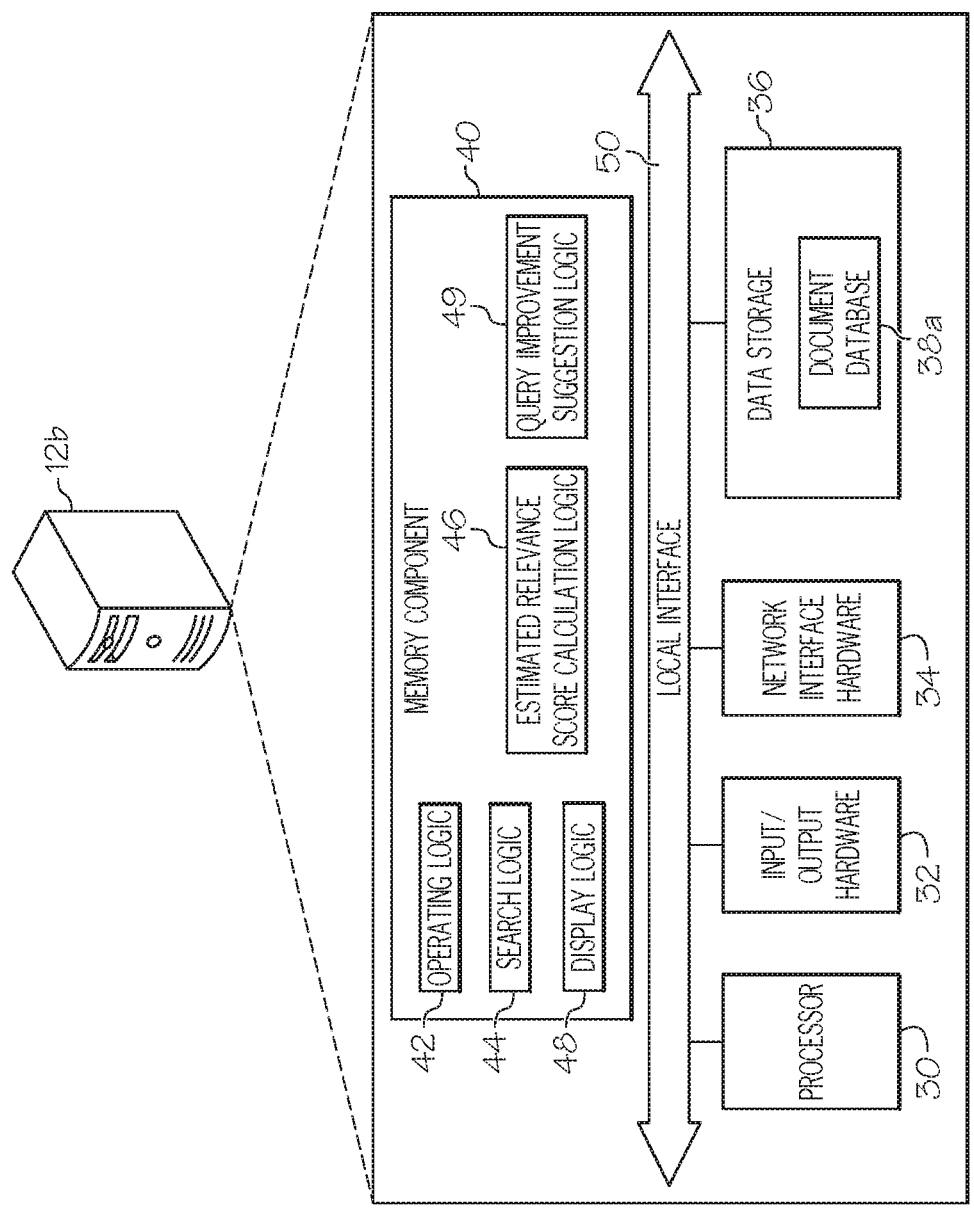
FIG. 2 depicts a schematic illustration of the server computing device from FIG. 1, further illustrating hardware and software that may be utilized to perform the functions described herein, according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store a document database 38a), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, search logic 44, estimated relevance score calculation logic 46, display logic 48, and query improvement suggestion logic 49 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store the document database 38a, which in at least one embodiment includes documents that have been organized and indexed for searching. The document database 38a may be stored in one or more data storage devices. In another embodiment, the server computing device 12b may be coupled to a remote server or data storage device that comprises one or more of the documents in the document database 38a. Other data may be stored in the data storage component 36 to provide support for functionalities described herein.

Included in the memory component 40 are the operating logic 42, the search logic 44, the estimated relevance score calculation logic 46, the display logic 48, and the query improvement suggestion logic 49. The operating logic 42 may include an operating system and/or other software for managing components of the server computing device 12b. Similarly, the search logic 44 may reside in the memory component 40 and may be configured to search the document database 38a based on search queries received from the user computing device 12a. The estimated relevance score calculation logic 46 may be operable to calculate an estimated relevance score for a result set of documents identified by searching the document database 38a based on a search query received from the user computing device 12a. The estimated relevance score is indicative of a degree to which the result set of documents are relevant to a search query. The display logic 48 may facilitate the display of a graphical user interface usable by a user of the user computing device 12a to provide search queries, to display visualizations of the search queries, and to display of the result set of documents and information pertaining to the result set of documents, such as an estimated relevance indicator. The display logic 48 may facilitate such information displayed on the user computing device 12a by transmitting information that is displayed by the user computing device 12a. The query improvement suggestion logic 49 may generate a query improvement suggestion that is transmitted to the user computing device 12a for display to a user. The functionalities of the operating logic 42, the search logic 44, the estimated relevance score calculation logic 46, the display logic 48, and the query improvement suggestion logic 49 will be described in further detail below.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
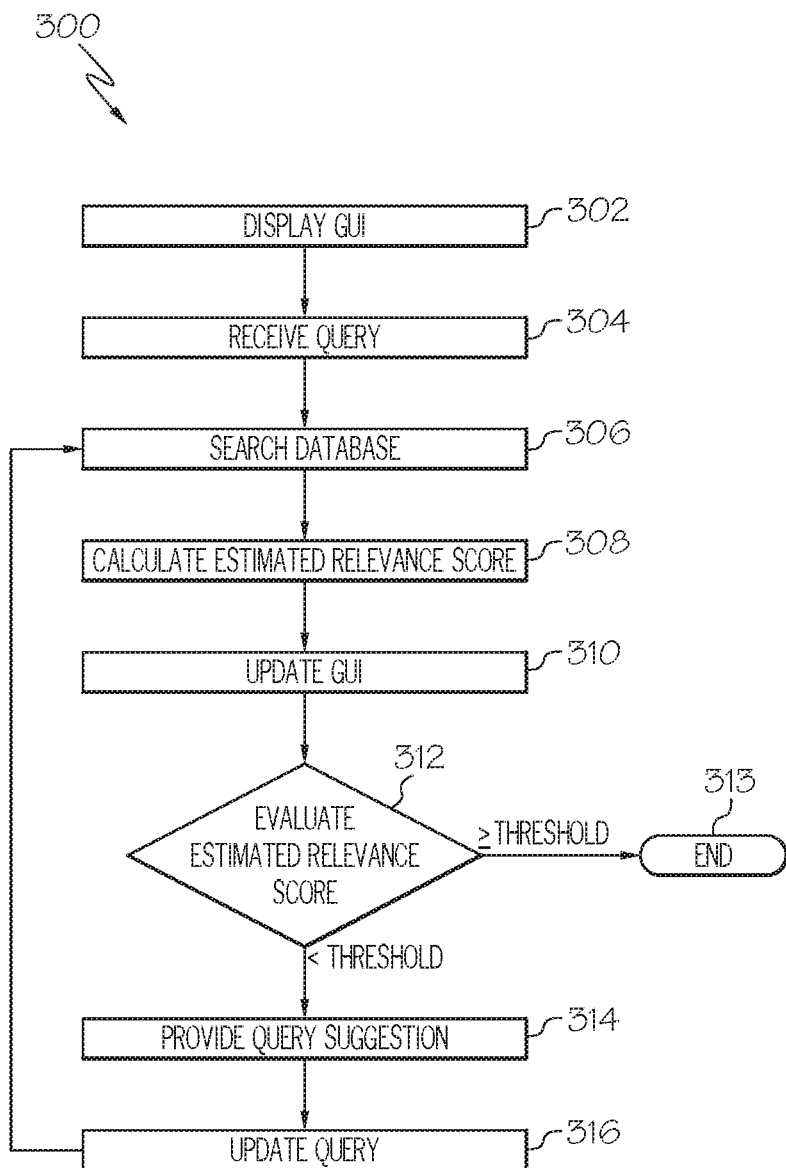
FIG. 3 depicts a flowchart graphically illustrating a method of facilitating the search of a document database, according to one or more embodiments shown and described herein.

Referring now to FIG. 3, a flowchart that graphically illustrates a method 300 of facilitating the search of a document database is provided. Although the steps associated with the blocks of FIG. 3 will be described as being separate tasks, in other embodiments, the blocks may be combined or omitted. Further, while the steps associated with the blocks of FIG. 3 will described as being performed in a particular order, in other embodiments, the steps may be performed in a different order.

Still referring to FIG. 3, at block 302, a graphical user interface is displayed. In some embodiments, the graphical user interface is displayed on a display device of the user computing device 12a. The graphical user interface may be displayed in response to a message received from the server computing device 12b, including one or more elements to be displayed in the graphical user interface. The server computing device 12b may generate the message or information to be displayed with the display logic 48. The graphical user interfaces described herein may facilitate the generation of search queries, the iterative refinement and manipulation of search queries, and the understanding of the estimated relevance of query results in an intuitive and user-friendly manner such that a user may identify desired content and have confidence that the identified content is relevant. The graphical user interfaces described herein may be particularly useful when the user computing device 12a is a tablet device or smartphone. Furthermore, it should be understood that any of the graphical user interfaces and elements described herein may be embedded or integrated in various product features and at various points of a search process.

Figure 4:
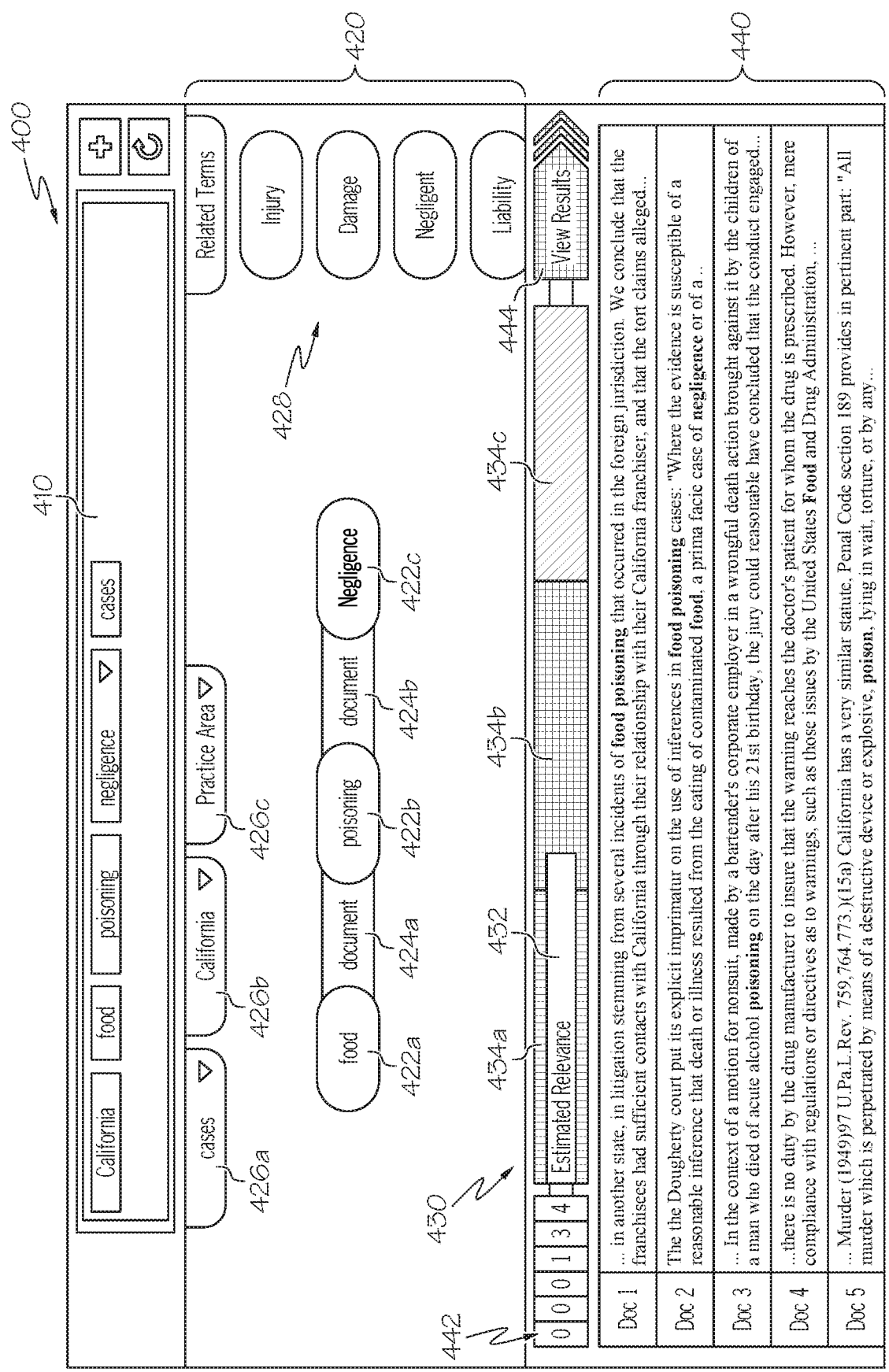
FIG. 4 depicts a schematic illustration of a graphical user interface including a query input element, a query visualization and manipulation element, an estimated relevance element, and a results feedback element, according to one or more embodiments shown and described herein.

For example, a graphical user interface displayed in accordance with some embodiments is depicted in FIG. 4. It should be understood that embodiments are not limited to the configurations of the graphical user interfaces illustrated throughout the figures, and that other graphical user interface configurations are possible. In one embodiment, the computer network 10 is the Internet and the graphical user interfaces described herein are presented to the user on a display device of the user computing device 12a via a web browser.

Referring to FIG. 4, the graphical user interface 400 includes a query input element 410, a query visualization and manipulation element 420, an estimated relevance element 430, and a results feedback element 440. The query input element 410 is configured to request a submission of a search query from a user. In some embodiments, text input may be provided in the query input element 410, such as when a user can select the query input element 410 as a field of entry and type text into the query input element 410. In some embodiments, a user may have been presented a separate search screen (e.g., a user interface with a search box and a "search" button) used by the user to enter the search query, such as by typing the search query into the search box or providing the search query by speaking the search query into a microphone. It should be understood that the user may interact with the user interfaces provided herein via voice to provide the user with a natural interaction experience, which may be useful in some embodiments in which the user computing device 12a is a tablet or smartphone. In embodiments in which the search query is input via voice, the voice input may be translated, parsed, or processed in some manner by a speech recognition algorithm to produce the search query. In some embodiments, the query input element 410 may include one or more prompts or screens that may guide a user through various pieces of information used to construct the search query (e.g., prompting a user to enter a practice area, a date range, a jurisdiction, one or more search query terms, or the like).

Still referring to FIG. 4, the graphical user interface 400 includes a query visualization and manipulation element 420. The query visualization and manipulation element 420 may provide a visual representation of the search query that was input into the query input element 410 and may facilitate the editing of the search query. The query visualization and manipulation element 420 depicted in FIG. 4 includes a plurality of nodes 422a, 422b, 422c and a plurality of connectors 424a, 424b. The nodes have a different shape from the connectors in the embodiment depicted in FIG. 4. However, the nodes and connectors may be the same shape in other embodiments.

Each of the plurality of nodes 422a, 422b, 422c corresponds to a query term of the search query that was input into the query input element 410. For example, node 422a graphically represents the "food" query term. Node 422b graphically represents the "poisoning" query term. Node 422c graphically represents the "negligence" query term. In some embodiments, one or more of the plurality of nodes 422a, 422b, 422c may include a concept node, which may include one or more query terms of the search query, one or more synonyms of one or more query terms, one or more variants of one or more query terms, or any combination of one or more query terms, one or more synonyms, and one or more variants. For example, FIG. 5 below describes how one or more synonyms and variants may be added to the node 422b, which is representative of the "poisoning" query term.

Each of the connectors 424a, 424b connects a pair of nodes and is representative of a required proximity of the corresponding query terms of the connected pair of nodes. For example, connector 424a connects node 422a and node 422b and represents a requirement that the "food" query term corresponding to node 422a and the "poisoning" query term corresponding to node 422b be contained within the same document in order for a document to be identified as matching the search query. The connectors may represent a document proximity (a requirement that the query terms corresponding to a pair of nodes must be contained within the same document in order for a document to be identified as matching the search query), a paragraph proximity (a requirement that the query terms corresponding to a pair of nodes must be contained within the same paragraph in order for a document to be identified as matching the search query), a sentence proximity (a requirement that the query terms corresponding to a pair of nodes must be contained within the same sentence in order for a document to be identified as matching the search query), a phrase proximity (a requirement that the query terms corresponding to a pair of nodes must be contained within the same phrase in order for a document to be identified as matching the search query), or the like Still referring to FIG. 4, the query visualization and manipulation element 420 includes three query component drop boxes. Namely, the query visualization and manipulation element 420 includes a content type drop box 426a, a jurisdiction drop box 426b, and a practice area drop box 426c. The content type drop box 426a may allow a user to limit the search to documents of a particular content type, such as cases, statutes, articles, and the like. In the embodiment depicted in FIG. 4, the content type drop box 426a displays "cases," indicating that the search will be limited to cases. The content type drop box 426a may be automatically populated based on text input into the query input element 410 (e.g., populating the content type drop box 426a with "cases" based on the presence of the term "cases" in the search query input into the query input element 410). The content type drop box 426a may also be manipulated by a user, such as when a user clicks on the content type drop box 426a, a list of possible content types is displayed, and a user selects one of the displayed content types.

Still referring to FIG. 4, the jurisdiction drop box 426b may allow a user to limit the search to documents from a particular jurisdiction, such as cases or other legal documents within a given state, court, circuit, or the like. In the embodiment depicted in FIG. 4, the jurisdiction drop box 426b displays "California," indicating that the search will be limited to content associated with California. The jurisdiction drop box 426b may be automatically populated based on text input into the query input element 410 (e.g., populating the jurisdiction drop box 426b with "California" based on the presence of the term "California" in the search query input into the query input element 410). The jurisdiction drop box 426b may also be manipulated by a user, such as when a user clicks on the jurisdiction drop box 426b, a list of possible jurisdictions is displayed, and a user selects one of the displayed jurisdictions.

Still referring to FIG. 4, the practice area drop box 426c may allow a user to limit the search to documents associated with a particular practice groups, such as document associated with torts, intellectual property, real property, criminal law, constitutional law, or the like. The practice area drop box 426c may be automatically populated based on text input into the query input element 410 and/or may be populated by user manipulation, such as when a user clicks on the practice area drop box 426c, a list of possible practice areas is displayed, and a user selects one of the displayed practice areas. It should be understood that other embodiments may include more or fewer query component drop boxes than depicted in FIG. 4, such that other query components may be added or removed by manipulation with a drop box or other user prompt.

Still referring to FIG. 4, the query visualization and manipulation element 420 includes a related terms element 428. The related terms element 428 displays one or more terms related to one or more of the search terms in the search query. The user may add one or more of the related terms to the query by adding the term to the query input box, dragging the term to create a node next to the nodes and connectors of the query, or the like. In some embodiments, the related terms are generated by the server computing device 12b based on one or more query terms of the search query transmitted from the user computing device 12a to the server computing device 12b. In such embodiments, the server computing device 12b transmits the related terms to the user computing device 12a for display on the user computing device 12a.

Still referring to FIG. 4, the graphical user interface 400 includes an estimated relevance element 430. In the embodiment depicted in FIG. 4, the estimated relevance element 430 includes an estimated relevance indicator 432. The estimated relevance indicator 432 provides a visual indication of the degree to which a result set of documents (identified by searching a document database with a search query) are relevant to the search query. In the embodiment depicted in FIG. 4, the estimated relevance indicator 432 is a bar. The bar may be displayed to provide a visual indication of a degree to which the result set of document are relevant to the search query, such as by varying the length of the bar such that the length of the bar is indicative of the degree to which the result set of documents are relevant to the search query. In some embodiments, a color of the estimated relevance indicator 432 is indicative of the degree to which the result set of documents are relevant to the search query, such as when the estimated relevance indicator 432 is red to indicate a low level of relevance, the estimated relevance indicator 432 is yellow to indicate a moderate level of relevance, and the estimated relevance indicator 432 is green to indicate a high level of relevance. The estimated relevance element 430 may also include a low relevance region 434a, a moderate relevance region 434b, and a high relevance region 434c. When the estimated relevance indicator 432 extends into the low relevance region 434a, the result set is estimated to be of low relevance. When the estimated relevance indicator 432 extends into the moderate relevance region 434b, the result set is estimated to be of moderate relevance. When the estimated relevance indicator 432 extends into the high relevance region 434c, the result set is estimated to be of high relevance. In other embodiment, the estimated relevance indicator 432 may be different from the embodiment depicted in FIG. 4 and described herein, such as in embodiment in which the estimated relevance indicator 432 is a gauge or a textual indication of the estimated relevance.

Still referring to FIG. 4, the graphical user interface 400 includes a results feedback element 440. The results feedback element 440 may display a preview or other display of a result set of documents identified by searching the document database with the search query. In one embodiment, the results feedback element 440 provides preview or other display of a subset of the result set of documents. In another embodiment, all of the returned electronic documents are provided in results feedback element 440. A scroll bar may be provided to enable the user to scroll through the returned electronic documents. The visual indication of the displayed documents may take on a variety of forms. In some embodiments, such as the embodiment depicted in FIG. 4, a document identifier and a relevant portion of the text within the document may be displayed. Other visual representations are also possible. The graphical user interface 400 also includes a number of results indicator 442 that is indicative of a number of documents in the result set of documents. In some embodiments, the results may be viewed in further detail by user manipulation of the view results button 444. The color of the view results button may provide a visual indication of the estimated relevance of the result set of document, such as when the view results button 444 is red to indicate a low level of relevance, the view results button 444 is yellow to indicate a moderate level of relevance, and the view results button 444 is green to indicate a high level of relevance Referring once again to FIG. 3 (and FIG. 1), at block 304, a search query may be received. In some embodiments, the search query received at block 304 may have been entered into the query input element 410 of the graphical user interface 400 displayed by the user computing device 12a, transmitted from the user computing device 12a to the server computing device 12b in response to initiation of the search by a user (e.g., by pressing enter or selecting a search initiation icon), and received by the server computing device 12b. The received search query includes a plurality of terms. For example, referring to FIGS. 4 and 1, a search query of "California food poisoning negligence cases" may be entered into the query input element 410 of the graphical user interface 400 displayed by the user computing device 12a, transmitted from the user computing device 12a to the server computing device 12b, and received by the server computing device 12b.

Referring once again to FIGS. 3 and 2, at block 306, the server computing device 12b may use the search logic 44 to search the document database 38a to identify a result set of document that are identified based on the search query received at block 304. The search logic 44 may employ a search algorithm that identifies the result set of documents as the documents in the document database 38a that include one or more of the query terms of the search query and satisfy any additional constraints associated with the search query, such as content type, proximity of terms, or the like. A variety of search algorithms may be employed by the search logic 44.

Still referring to FIGS. 3 and 2, at block 308, the server computing device 12b may use the estimated relevance score calculation logic 46 to calculate an estimated relevance score for the result set of documents. As noted above, the estimated relevance score is indicative of a degree to which the result set of documents are relevant to the search query. In some embodiments, the estimated relevance score may be calculated based on one or more context characteristics, one or more query characteristics, or one or more results characteristics. The estimated relevance score may be calculated based on a plurality of weighted score components, which may include one or more context characteristics, one or more query characteristics, or one or more results characteristics, as will be described in the following sections that describe the various context characteristics, query characteristics, and results characteristics and how the estimated relevance score may be calculated based on them.

Calculation of the Estimated Relevance Score Based on Context Characteristics When the estimated relevance score is calculated based on one or more context characteristics, the server computing device 12b may determine one or more context characteristics that are indicative of a context of the search query and then calculate the estimated relevance score based on the one or more context characteristics.

The one or more context characteristics may include a user profile, which may include such information as a user identifier, a practice area, a jurisdiction, user preferences, or the like. In some embodiments, the estimated relevance score is calculated based on the user profile. For example, the estimated relevance score may be calculated as higher based on the user profile (e.g., by calculating the estimated relevance score as higher when a high proportion of the result set of documents are from the practice area included in the user profile) or may be calculated as lower based on the user profile (e.g., by calculating the estimated relevance score as lower when a lower proportion of the result set of documents are from the practice area included in the user profile). In some embodiments, the estimated relevance score may be calculated based on a plurality of weighted score components, including a user profile component that is calculated based on the user profile. In some embodiments, the estimated relevance score may be calculated as another function of the user profile.

The one or more context characteristics may include a device type, which may indicate whether the user computing device 12a is a personal computer, a laptop computer, a tablet, a smartphone, or the like. In some embodiments, the estimated relevance score is calculated based on the device type, such as when the estimated relevance score is only calculated or utilized when the device type is a tablet or smartphone.

The one or more context characteristics may include a geographic location or a network location. In some embodiments, the estimated relevance score is calculated based on the geographic location or network location. For example, the estimated relevance score may be calculated based on a geographic location indicative of a user being away from an office or a geographic location indicative of a user being in an office. In some embodiments, the estimated relevance score is calculated based on the geographic location or network location, such as when the estimated relevance score is only calculated or utilized when the user is away from the office.

Calculation of the Estimated Relevance Score Based on Query Characteristics

When the estimated relevance score is calculated based on one or more query characteristics, the server computing device 12b may determine one or more query characteristics that are indicative of a characteristic of the search query and then calculate the estimated relevance score based on the one or more query characteristics.

The one or more query characteristics may include a number of query terms in the search query. In some embodiments, the estimated relevance score is calculated based on the number of query terms. For example, the estimated relevance score may be calculated as proportional to the number of query terms. In some embodiments, the estimated relevance score may be calculated as a bell-shaped function of the number of query terms, such that the estimated relevance score is lower when there are a low number of query terms (e.g., 3 or less query terms), higher when there are a medium number of query terms (e.g., 4 to 7 query terms), and lower when there are a high number of query terms (e.g., 8 or more query terms). In some embodiments, the estimated relevance score may be calculated based on a plurality of weighted score components, including a number of query terms component. In some embodiments, the estimated relevance score may be calculated as another function of the number of query terms.

The one or more query characteristics may include an inclusion of a recognized phrase. In some embodiments, the estimated relevance score is calculated based on the inclusion of a recognized phrase. For example, the estimated relevance score may be calculated as higher when the search query includes a recognized phrase, such as the recognized legal phrase "adverse possession," "eminent domain," "fiduciary duty," or the like. The estimated relevance score may be calculated as lower when the search query does not include a recognized phrase, such as when the search query includes disjoint query terms that are not part of one or more recognized phrases. In some embodiments, one or more recognized phrases may be stored in the data storage component 36 or the memory component 40 of the server computing device 12b. In some such embodiments, the estimated relevance score is calculated based on whether the search query includes at least one of the recognized phrases stored in the data storage component 36 or the memory component 40. In some embodiments, the estimated relevance score may be calculated based on a plurality of weighted score components, including an inclusion of a recognized phrase component. In some embodiments, the estimated relevance score may be calculated as another function of the inclusion of a recognized phrase.

The one or more query characteristics may include an inclusion of a citation. In some embodiments, the estimated relevance score is calculated based on the inclusion of a citation. For example, the estimated relevance score may be calculated as higher when the search query includes a citation. The estimated relevance score may be calculated as lower when the search query does not include a citation. In the context of a legal search query used to search legal documents contained in the document database 38a of the server computing device 12b, the estimated relevance score may be calculated as higher when the search query includes a legal citation, such as a citation to a court case, a citation to a statute, or the like. Conversely, the estimated relevance score may be calculated as lower when the search query does not include a legal citation. In some embodiments, the estimated relevance score may be calculated based on a plurality of weighted score components, including the inclusion of a citation component. In some embodiments, the estimated relevance score may be calculated as another function of the inclusion of a citation.

The one or more query characteristics may include an inclusion of a search filter. In some embodiments, the estimated relevance score is calculated based on the inclusion of the search filter. For example, the estimated relevance score may be calculated as higher when the search query includes a search filter. The estimated relevance score may be calculated as lower when the search query does not include a search filter. The search filter may be a date range filter, such as when a user limits the search to a particular date range by entering a date range in the query input element 410 or selects a date range from a drop down box or other filter. The search filter may be a jurisdiction filter, such as when a user limits the search to cases or statutes from a particular jurisdiction by entering a jurisdiction in the query input element 410 or selecting a jurisdiction from the jurisdiction drop box 426b. The search filter may be a content type filter, such as when a user limits the search to a particular content type (e.g., cases, statutes, law review articles, or the like) by entering a content type in the query input element 410 or selecting a content type from the content type drop box 426a. The search filter may be a practice area filter, such as when a user limits the search to documents from a particular practice area (e.g., torts, intellectual property, real property, criminal law, constitutional law, or the like) by entering a practice area in the query input element 410 or selecting a practice area from the practice area drop box 426c. It should be understood that the estimated relevance score may be calculated based on a variety of additional filters that may be applied to the search query other than the filters specifically described herein.

The one or more query characteristics may include an ambiguity score. In some embodiments, the estimated relevance score is calculated based on the ambiguity score. The ambiguity score provides a measurement of how ambiguous a query is based on its linguistics. In some embodiments, the server computing device 12b uses query ambiguity determination logic stored in the memory component 40 to analyze the ambiguity of the query and to calculate the ambiguity score. In some embodiments, the estimated relevance score may be calculated based on a plurality of weighted score components, including an ambiguity score component. In some embodiments, the estimated relevance score may be calculated as another function of the ambiguity score.

The one or more query characteristics may include a degree of query similarity. The degree of query similarity is indicative of a degree of similarity to at least one previous search query. For example, the degree of query similarity may be a degree of similarity to a previous search query by another user in a similar context (e.g., in the same content area, in the same practice area, or the like). The degree of query similarity may be a degree of similarity to a previous search query that identified a result set from which information was captured, as evidenced by a user downloading, printing, e-mailing, or saving documents from the previously identified result set or content from the documents of the previously identified result set. The degree of query similarity may be a degree of similarity to a previous search query that identified a result set from which documents were analyzed, as evidenced by a user performing a citation analysis, highlighting, annotating, or viewing documents from the previously identified result set or content from the documents of the previously identified result set. The estimated relevance score may be calculated based on the degree of query similarity. For example, the estimated relevance score may be calculated as higher when the search query is similar to a previous search query that included a result set from which documents or content of the documents of the result set was downloaded, printed, e-mailed, saved, or the like. In some embodiments, the estimated relevance score may be calculated based on a plurality of weighted score components, including a degree of query similarity component. In some embodiments, the estimated relevance score may be calculated as another function of the degree of query similarity.

Calculation of the Estimated Relevance Score Based on Results Characteristics When the estimated relevance score is calculated based on one or more results characteristics, the server computing device 12b may determine one or more results characteristics that are indicative of the result set of documents and then calculate the estimated relevance score based on the one or more results characteristics.

The one or more results characteristics may include a terms relevance. The terms relevance may be indicative of an extent to which the query terms of the search query match one or more terms in at least one document of the result set of documents. The terms relevance may be calculated by calculating a term frequency-inverse document frequency ("tf-idf") for each of the query terms in the search query in each of the documents in the result set of documents and then using the calculated tf-idf values to determine the estimated relevance score. The estimated relevance score may then be calculated based on the terms relevance calculations for one or more of the documents in the result set. The estimated relevance score is calculated based on the terms relevance in a variety of ways, such as when the estimated relevance score is calculated based on an average relevance per document of the result set, based on an average relevance per document in a subset of the result set of documents (e.g., the top 25 results), a relevance difference between a first document of the result set of documents and a second document in the result set of documents (e.g., a tf-idf difference between the first document of the top 25 results and the twenty-fifty document of the top 25 results). In some embodiments, the estimated relevance score may be calculated based on a plurality of weighted score components, including a terms relevance component. In some embodiments, the estimated relevance score may be calculated as another function of the terms relevance.

The one or more results characteristics may include a terms relevance precipitation. The terms relevance precipitation may be indicative of a difference in relevance between a first document of the result set of documents and a second document of the result set of documents. In some embodiments, the terms relevance of the first document and the second document may be calculated in any of the ways described in the preceding paragraph. In some embodiments, the estimated relevance score is calculated based on the terms relevance precipitation. For example, a subset of relevant documents may be identified from the result set, such as when the "top 25" documents by tf-idf score are identified. The subset of documents may be ranked from highest terms relevance to lowest terms relevance. The terms relevance precipitation may be calculated in this example by subtracting the terms relevance of the lowest ranked document of the "top 25" documents from the terms relevance of the highest ranked document of the "top 25" documents. The estimated relevance score may be calculated as proportional to the terms relevance precipitation because a high difference in relevance between the highest ranked document in a subset and the lowest ranked document in the subset is indicative of an effective differentiation in the relevance of the documents of the subset and may be indicative of an effective search query. In some embodiments, the estimated relevance score may be calculated based on a plurality of weighted score components, including a terms relevance precipitation component. In some embodiments, the estimated relevance score may be calculated as another function of the terms relevance precipitation.

The one or more results characteristics may include a best paragraphs terms prevalence. The best paragraph terms prevalence may be indicative of a number of query terms and/or synonyms of the query terms included in at least one paragraph of at least one document of the result set of documents. For example, one or more paragraphs in a document in the result set may be identified as a "best paragraph" based on the presence of query terms and/or synonyms of query terms in the paragraph. The number of the query terms and/or synonyms of the query terms in the "best paragraph" may be calculated. The best paragraphs terms prevalence for an identified "best paragraph" may be calculated in a number of ways, including based on the absolute number of query terms in the identified "best paragraph," the absolute number of query terms and synonyms of the query terms in the identified "best paragraph," the ratio of query terms in the identified "best paragraph" to the total number of terms in the identified "best paragraph," the ratio of query terms and synonyms of the query terms in the "best paragraph" to the total number of terms in the identified "best paragraph," and the like. The estimated relevance score may be calculated based on the best paragraphs terms prevalence by using the best paragraphs terms prevalence of a single "best paragraph" from each document in the result set, by using the best paragraphs terms prevalence of multiple "best paragraphs" from each document in the result set, by using the best paragraphs terms prevalence of a single "best paragraph" from a subset of the documents in the result set, or by using the best paragraphs terms prevalence of multiple documents from a subset of the documents in the result set. In some embodiments, the estimated relevance score may be calculated based on a plurality of weighted score components, including a best paragraphs terms prevalence component. In some embodiments, the estimated relevance score may be calculated as another function of the best paragraphs terms prevalence.

The one or more results characteristics may include a topical diversity. The topical diversity may be indicative of a variance in topics within the result set of documents. The topical diversity may be calculated in a number of ways. For example, in the context of legal documents, the topical diversity may be calculated based on a degree that query terms match terms in a legal taxonomy (e.g., by comparing the query terms to terms included in a separate legal taxonomy stored in the data storage component 36 or the memory component 40 of the server computing device 12b) or based on practice areas associated with documents in the result set (e.g., by comparing a practice area associated with the documents in the result set with a practice area of the search query). The topical diversity may be calculated for the entire result set of documents or for a subset of the documents in the result set of documents. The estimated relevance score may be calculated based on the topical diversity. For example, the estimated relevance score may be calculated as inversely proportional to the topical diversity because a result set that is focused on a particular topic is more likely to be relevant to the search query than a result set that includes documents scattered among a number of topics. In some embodiments, the estimated relevance score may be calculated based on a plurality of weighted score components, including a topical diversity component. In some embodiments, the estimated relevance score may be calculated as another function of the topical diversity.

The one or more results characteristics may include a content variability. The content variability may be indicative of a variance in content within the result set of documents. The content variability may include a variance in recency among the result set of documents, a variance in jurisdiction (in the case of legal documents) among the result set of documents, a variance in invention class (in the case of patent documents) among the result set of documents, a variance in legal issues among the result set of documents, or the like. The content variability may be calculated for the entire result set of documents or for a subset of the documents in the result set of documents. The estimated relevance score may be calculated based on the content variability. For example, the estimated relevance score may be calculated as inversely proportional to the content variability because a result set that is focused on a particular content aspect is more likely to be relevant to the search query than a result set that includes documents scattered among a number of content aspects. In some embodiments, the estimated relevance score may be calculated based on a plurality of weighted score components, including a content variability component. In some embodiments, the estimated relevance score may be calculated as another function of the content variability.

The one or more results characteristics may include a terms proximity. The terms proximity may be indicative of a proximity of the query terms within a portion of at least one document of the result set of documents. The proximity of the query terms within a portion of a document indicates the degree to which the terms are concentrated within the document versus distributed throughout the document. A document with a higher terms proximity is likely to be more relevant because it has a greater proportion of query terms proximate to one another. The terms proximity may be calculated in a number of ways, such as by determining an average number of words between query terms, by determining an average number of words between query terms in a paragraph of the document, or the like. The terms proximity may also be calculated based on the proximity between both query terms and synonyms to the query terms. The estimated relevance score may then be calculated based on the terms proximity for one or more of the documents in the result set. In some embodiments, the estimated relevance score may be calculated based on a plurality of weighted score components, including a terms proximity component. In some embodiments, the estimated relevance score may be calculated as another function of the terms proximity.

The one or more results characteristics may include a query to core terms ratio. The query to core terms ratio may be indicative of a degree of overlap between query terms and core terms in at least one document of the result set of documents. Each of the documents in the result set may include one or more terms identified as "core terms" for the document, which may be indicative of terms that summarize the content or focus of the document or terms that indicate important concepts within the document. The query to core terms ratio may be calculated by dividing the number of query terms with the number of core terms in the document that are also query terms. A document with a lower query to core terms ratio is likely to be more relevant to a given search query. In some embodiments, the query to core terms ratio may be calculated by dividing the number of query terms with the number of core terms in the document that are also query terms or synonyms of the query terms. The estimated relevance score may then be calculated based on the query to core terms ratio for one or more of the documents in the result set. In some embodiments, the estimated relevance score may be calculated based on a plurality of weighted score components, including a query to core terms ratio component. In some embodiments, the estimated relevance score may be calculated as another function of the query to core terms ratio.

The one or more results characteristics may include a document recency indicator. The document recency indicator may be indicative of a date of at least one document of the result set of documents. In some contexts, such as the news or financial context, a document that is more recent is likely to be more relevant. The estimated relevance score may then be calculated based on the document recency indicator for one or more of the documents in the result set or for the result set as a whole. In some embodiments, the estimated relevance score may be calculated based on a plurality of weighted score components, including a document recency indicator. In some embodiments, the estimated relevance score may be calculated as another function of the document recency indicator.

The one or more query characteristics may include a number of documents in the result set of documents. In some embodiments, the estimated relevance score is calculated based on the number of documents in the result set of documents. For example, the estimated relevance score may be calculated as inversely proportional to the number of documents in the result set of documents. In some embodiments, the estimated relevance score may be calculated as a bell-shaped function of the number of documents in the result set of documents, such that the estimated relevance score is lower when there are a low number of documents in the result set of documents, higher when there are a medium number of documents in the result set of documents, and lower when there are a high number of documents in the result set of documents. In some embodiments, the estimated relevance score may be calculated based on a plurality of weighted score components, including a number of documents in the result set of documents. In some embodiments, the estimated relevance score may be calculated as another function of the number of documents in the result set of documents.

Examples of Weighted Estimated Relevance Score Components

As noted above, the estimated relevance score may be calculated based on a plurality of weighted score components, which may include one or more of the context characteristics, one or more of the query characteristics, or one or more of the results characteristics described above. The estimated relevance score may have a value between 0% and 100% or 0 and 1. Of course, it should be understood that the estimated relevance score may vary between other lower bounds and upper bounds in other embodiments. In some embodiments, a weight is assigned to each of a plurality of weighted components used to calculate the estimated relevance score. In some embodiments in which the estimated relevance score varies between 0% and 100%, the weights of each of the weighted components add up to 100%. The particular components used to calculate the estimated relevance score and the weights of the components may vary based on the use case or the context, among other variables. A few non-limiting examples will now be provided of score components and their associated weights.

In a limited computing context, such as when a user utilizes a tablet or smartphone to perform a query, the following characteristics and weights may be used to calculate the estimated relevance score. In the limited computing context, the results characteristics may be determined for the entire result set or a subset of the result set, such as the top 25 documents.

TABLE 1

| Type | Component | Weight (%) |
| --- | --- | --- |
| Context | User profile | 5 |
| Query | Number of query terms | 15 |

TABLE 1-continued

| Type | Component | Weight (%) |
| --- | --- | --- |
|  | Inclusion of a filter | 20 |
|  | Ambiguity score | 10 |
| Results | Number of documents in result set | 15 |
|  | Terms relevance | 20 |
|  | Terms relevance precipitation | 10 |
|  | Document recency indicator | 5 |

In a more robust computing context, such as when a user utilizes a desktop or laptop computer, the following characteristics and weights may be used to calculate the estimated relevance score. In the more robust computing context, the results characteristics may be determined for the entire result set or a subset of the result set, such as the top 50 documents or the top 100 documents

TABLE 2

| Type | Component | Weight (%) |
| --- | --- | --- |
| Context | User profile | 5 |
| Query | Number of query terms | 5 |
|  | Inclusion of a filter | 5 |
|  | Ambiguity score | 5 |
|  | Degree of similarity to previous query | 5 |
| Results | Number of documents in result set | 5 |
|  | Terms relevance | 15 |
|  | Terms relevance precipitation | 10 |
|  | Best paragraphs terms prevalence | 10 |
|  | Topical diversity | 15 |
|  | Terms proximity | 5 |
|  | Query to core terms ratio | 10 |
|  | Document recency indicator | 5 |

In some embodiments, it may be desirable to utilize only one type of characteristics to calculate the estimated relevance score. For example, in some embodiments, only results characteristics are utilized to calculate the estimated relevance score, such as shown in the non-limiting example below.

TABLE 3

| Type | Component | Weight (%) |
| --- | --- | --- |
| Results | Number of documents in result set | 10 |
|  | Terms relevance | 15 |
|  | Terms relevance precipitation | 10 |
|  | Best paragraphs terms prevalence | 15 |
|  | Topical diversity | 15 |
|  | Terms proximity | 10 |
|  | Query to core terms ratio | 15 |
|  | Document recency indicator | 10 |

The particular components used to calculate the estimated relevance score and the weights of the components may vary based on the type of query. For example, the components and weights shown two charts above may be used for a case law search while the chart below may be used for a search for patent documents. The case law search uses a topical diversity component while the patent search uses a class/subclass diversity because topical diversity is more indicative of document relevance in the case law context while class/subclass diversity is more indicative of document relevance in the patent document context. The estimated relevance score for the patent document search does not include ambiguity score or document recency indicator because these characteristics may be useful in the case law context, but not useful in the patent document context.

TABLE 4

| Type | Component | Weight (%) |
| --- | --- | --- |
| Context | User profile | 5 |
| Query | Number of query terms | 5 |
| | Inclusion of a filter | 5 |
| | Degree of similarity to previous query | 5 |
| Results | Number of documents in result set | 10 |
| | Terms relevance | 20 |
| | Terms relevance precipitation | 10 |
| | Best paragraphs terms prevalence | 10 |
| | Class/subclass diversity | 15 |
| | Terms proximity | 5 |
| | Query to core terms ratio | 10 |

Accordingly, it should be understood that the particular components and the weights of the components that are used to calculate the estimated relevance score may vary based on a number of factors, such as the device used to perform the search, the type of search, the user performing the search, or the like.

Referring once again to FIG. 3 (and FIGS. 2 and 4), at block 310, the server computing device 12b may use the display logic 48 to update the graphical user interface 400. The results feedback element 440 may be updated based on the result set of documents identified at block 306. In the embodiment depicted in FIG. 4, the results feedback element 440 is updated to display relevant portions of the top five ranked documents of the result set of documents. The number of results indicator 442 is also updated to display "134," indicating that there are 134 documents in the result set of documents. The estimated relevance element 430 is updated to display an estimated relevance indicator 432 to provide a visual indication of the degree to which the result set of documents are relevant to the search query. The estimated relevance indicator 432 depicted in FIG. 4 indicates that the result set of documents identified by the initial search query are estimated to be of moderate relevance, as indicated by the length of the bar extending into the moderate relevance region 434b. The estimated relevance indicator may provide a visual indication to a user of the user computing device 12a that query improvement is suggested, such as when the estimated relevance indicator 432 only extends into the low relevance region 434a or into the moderate relevance region 434b. The view results button 444 may also be displayed as yellow to indicate that the results are estimated to be of moderate relevance.

Still referring to FIG. 3 (and FIGS. 2 and 4), at block 312, the server computing device 12b may determine whether the estimated relevance score is less than a relevance score threshold. The relevance score threshold may depend on the context of the search. In some embodiments, the relevance score threshold may be 33%, 50%, or 66%. If the estimated relevance score is determined to be greater than or equal to the relevance threshold, the server computing device 12b may not provide a suggestion for improving the query and the method 300 may end at block 314. After the method 300 ends, the user may still be able to review the results in the results feedback element 440, create a new query, or manipulate an existing query.

Figure 5:
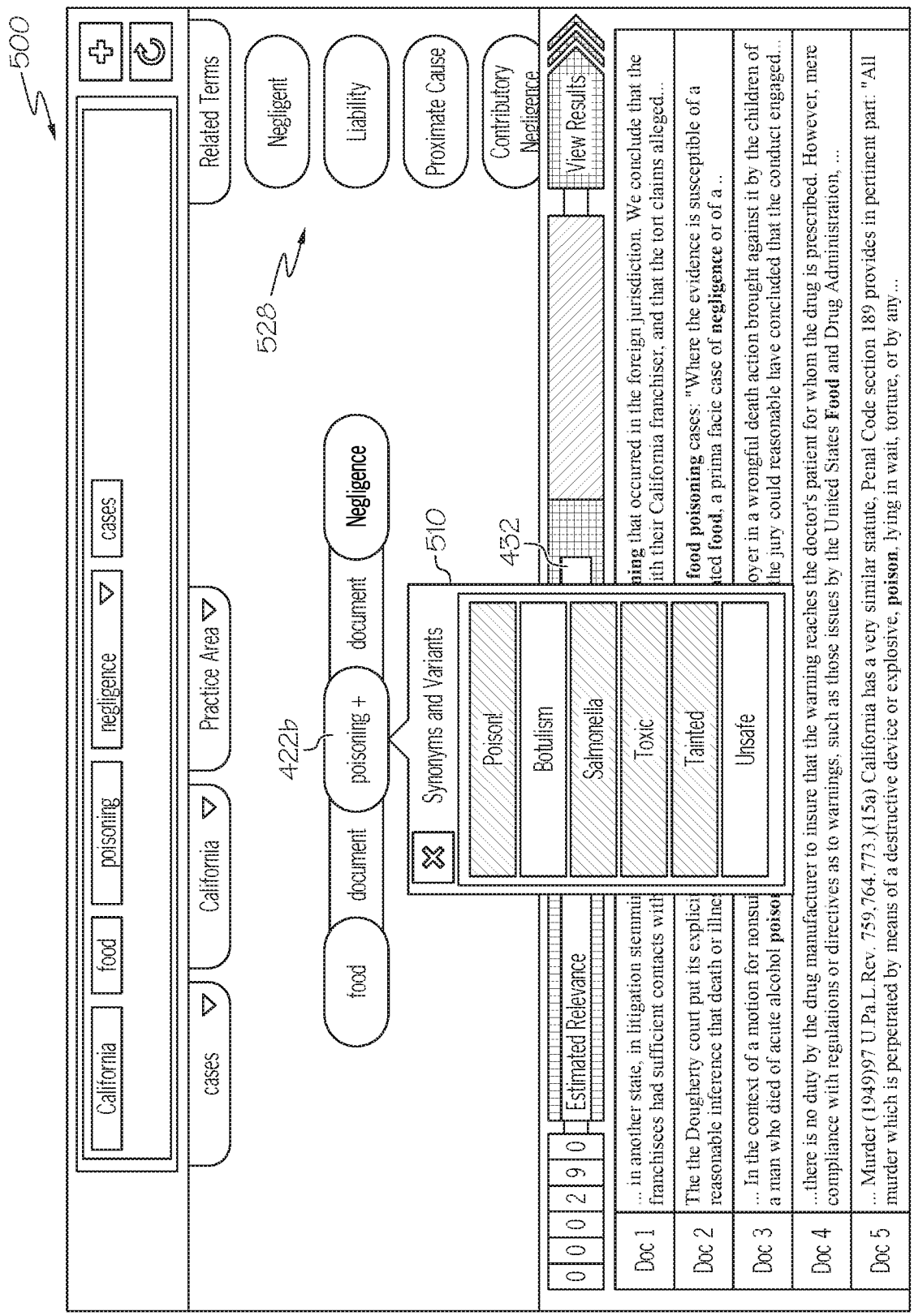
FIG. 5 depicts a schematic illustration of a graphical user interface illustrating a query improved by adding synonyms and variants to one of the query terms and the resulting improvement in estimated relevance of the result set, according to one or more embodiments shown and described herein.

Still referring to FIG. 3 (and FIG. 2), in response to determining that the estimated relevance score is less than the relevance score threshold, the query visualization and manipulation element 420 may be updated to provide at least one suggestion for improving the search query at block 314. Referring now to FIG. 5, a synonyms and variants box 510 may be displayed as a suggestion for improving the search query. The synonyms and variants box 510 includes synonyms, variants, or related terms to the "poisoning" search term. Specifically, the synonyms and variants box 510 includes "poison!" (which includes all stemmed variants of the term "poison," e.g., poison, poisoned, poisoning, etc.), "botulism," "salmonella," "toxic," "tainted," and "unsafe." In some embodiments, the synonyms and variants box 510 is displayed automatically in response to determining that the estimated relevance score is less than the relevance score threshold. In other embodiments, the synonyms and variants box 510 is displayed in response to a user manipulating or selecting node 422b (the node corresponding to the "poisoning" search term). In some embodiments, the suggestions for improving the search query may include displaying related terms to one or more of the query terms (such as shown in the related terms element 528 of FIG. 5), suggesting one or more query terms, or suggesting one or more search filters. In some embodiments, the suggestion for improving the search query may include providing for display a prompt requesting an entry of at least one predefined query component or filter, such as a jurisdiction, a date, a practice area, a content type, or the like. It should be understood that other query suggestions are possible. The user may select a number of terms from the synonyms and variants box 510, which are added to the concept node 422b, as depicted in FIG. 5 where the user has selected "poison!," "salmonella," "toxic," and "tainted."

Still referring to FIG. 3 (and FIG. 2), in response to providing at least one suggestion for improving the search query (as described above with respect to block 314), a query improvement may be received and an improved search query may be generated at block 316 in response to the received query improvement. For example, referring once again to FIG. 5, the query improvement of adding the selected "poison!," "salmonella," "toxic," and "tainted" terms to the query may be received by the server computing device 12b. The server computing device 12b may generate an improved search query based on the received query improvement by adding the selected "poison!," "salmonella," "toxic," and "tainted" terms. After generating the improved search query, the server computing device 12b may return to block 306 to search the document database 38a using the improved search query to identify an improved result set of documents. The server computing device 12b may calculate an improved estimated relevance score for the improved result set of documents in the manner as described above with respect to block 308. The server computing device 12b may update the graphical user interface 500 by updating the results feedback element based on the improved result set of documents and update the estimated relevance indicator 432 for the improved result set of documents, as described above with respect to block 310. As shown in FIG. 5, the improved estimated relevance score for the result set identified based on the improved search query is higher, as shown by the updated estimated relevance indicator 432 advancing farther to the right.

Figure 6:
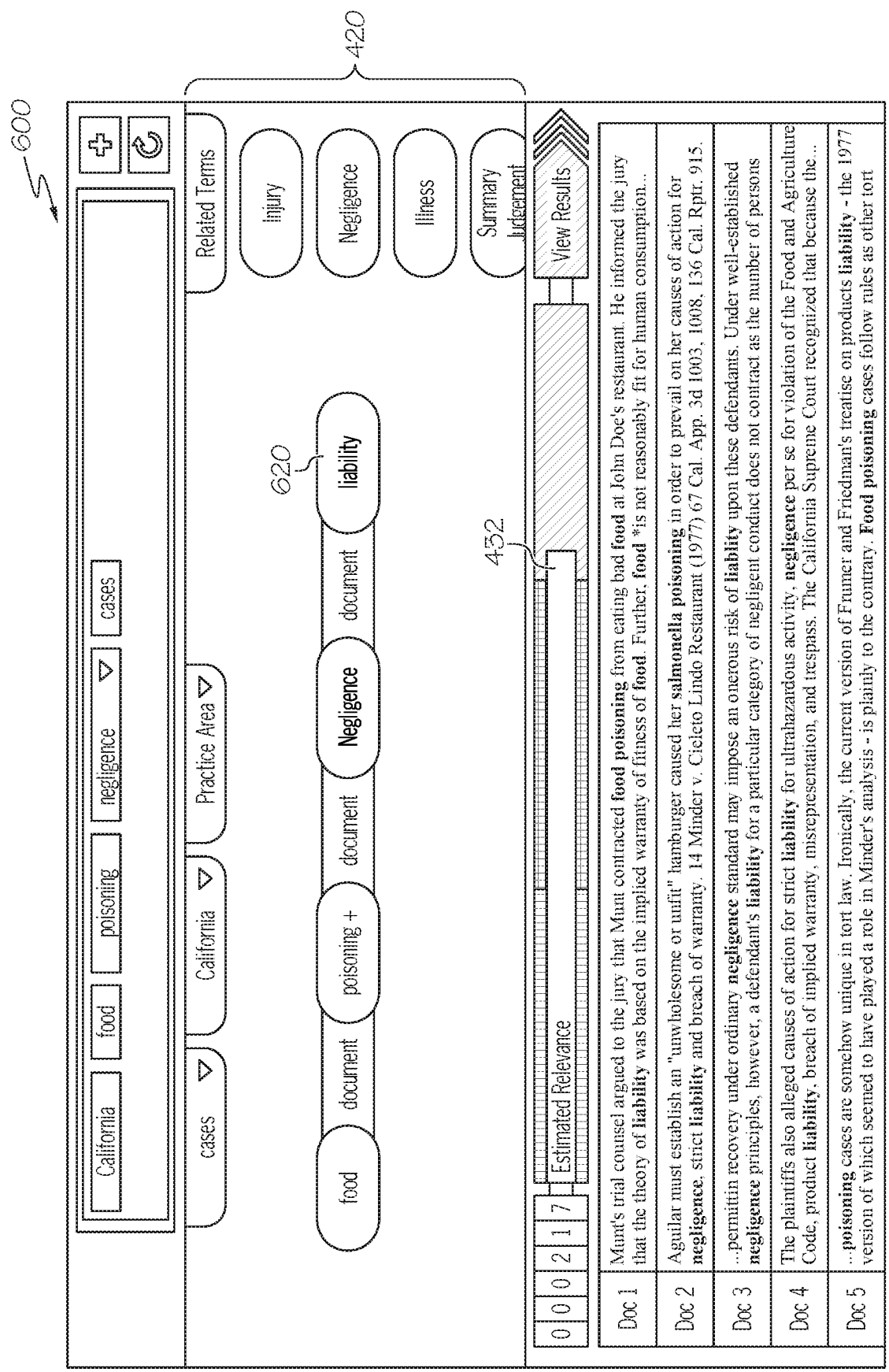
FIG. 6 depicts a schematic illustration of a graphical user interface illustrating a query improved by adding an additional query term to the search query and the resulting improvement in estimated relevance of the result set, according to one or more embodiments shown and described herein.

The user may continue to manipulate and improve the query in the query visualization and manipulation element 420 and/or based on suggested query improvements until the user is satisfied with the estimated relevance of the result set, as shown by the estimated relevance indicator in the graphical user interface. For example, the user may add the related term "liability" to the search query. The "liability" term may be added to the query by allowing a user to drag and drop a node corresponding to the "liability" term from the related terms element 528 (as shown in FIG. 5) to be proximate to the other nodes of the query, as shown in FIG. 6, which graphically depicts the "liability" term added to the search query as node 620. After adding the liability term to the search query, the server computing device 12*b* may generate an improved search query, search the database to identify an improved result set of documents, calculate an improved estimated relevance score for the improved result set of documents, and update the graphical user interface by updating the results feedback element based on the improved result set of documents, as described above with respect to blocks 306-310. As shown in FIG. 6, the improved estimated relevance score for the result set identified based on the improved search query is higher, as shown by the updated estimated relevance indicator 432 advancing farther to the right and into the high estimated relevance region.

Figure 7:
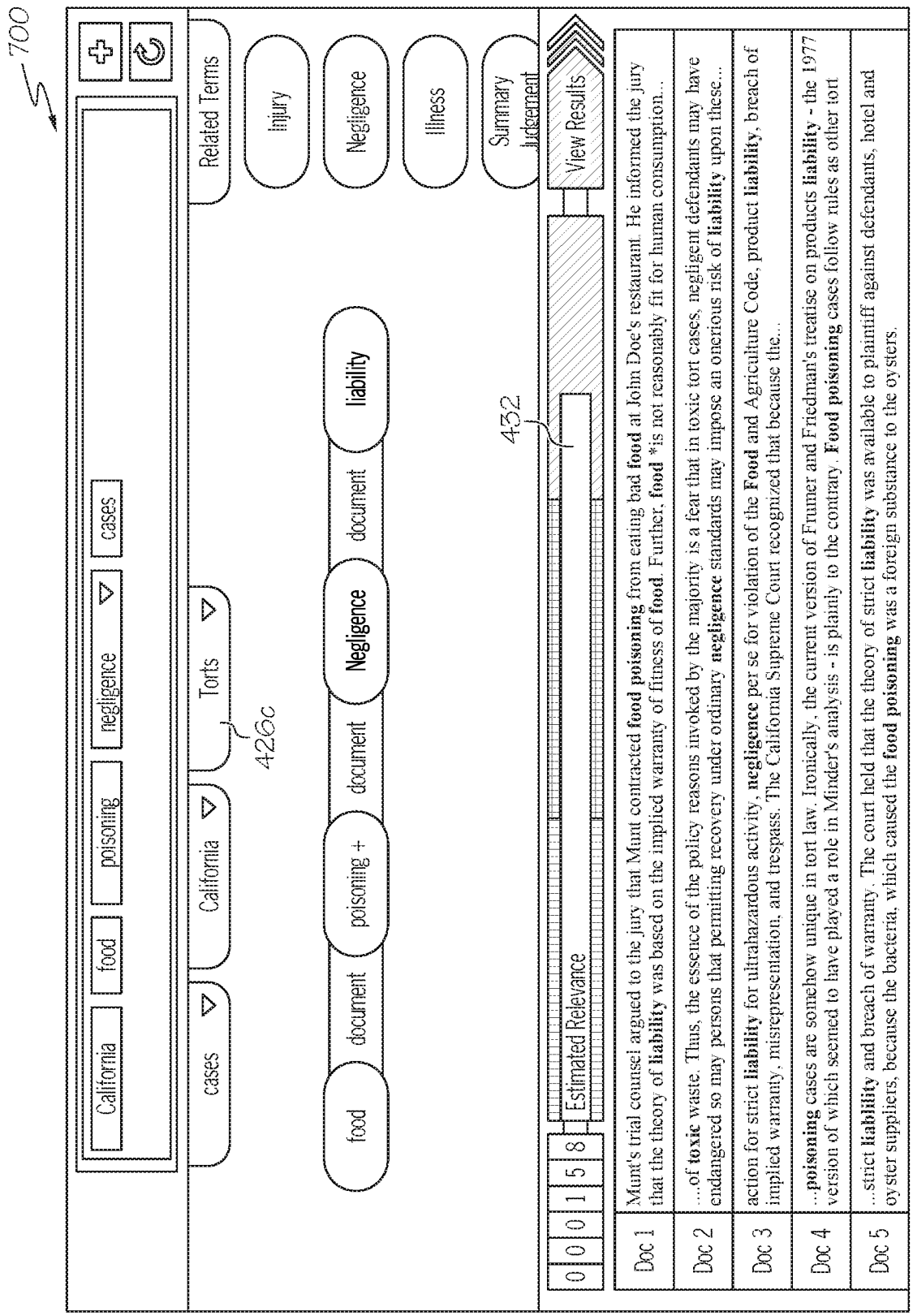
FIG. 7 depicts a schematic illustration of a graphical user interface illustrating a query improved by selecting a practice group and the resulting improvement in estimated relevance, according to one or more embodiments shown and described herein.

Referring now to FIG. 7, the user may further improve the query by selecting "torts" as the practice area from the practice area drop box 426*c*. In some embodiments, a prompt is displayed requesting an entry of the practice area, or another predefined query component, such as jurisdiction, date, and content type. After adding the setting torts as the practice area, the server computing device 12*b* may generate an improved search query, search the database to identify an improved result set of documents, calculate an improved estimated relevance score for the improved result set of documents, and update the graphical user interface by updating the results feedback element based on the improved result set of documents, as described above with respect to blocks 306-310. As shown in FIG. 7, the improved estimated relevance score for the result set identified based on the improved search query is higher, as shown by the updated estimated relevance indicator 432 advancing farther to the right into the high estimated relevance region.

Figure 8:
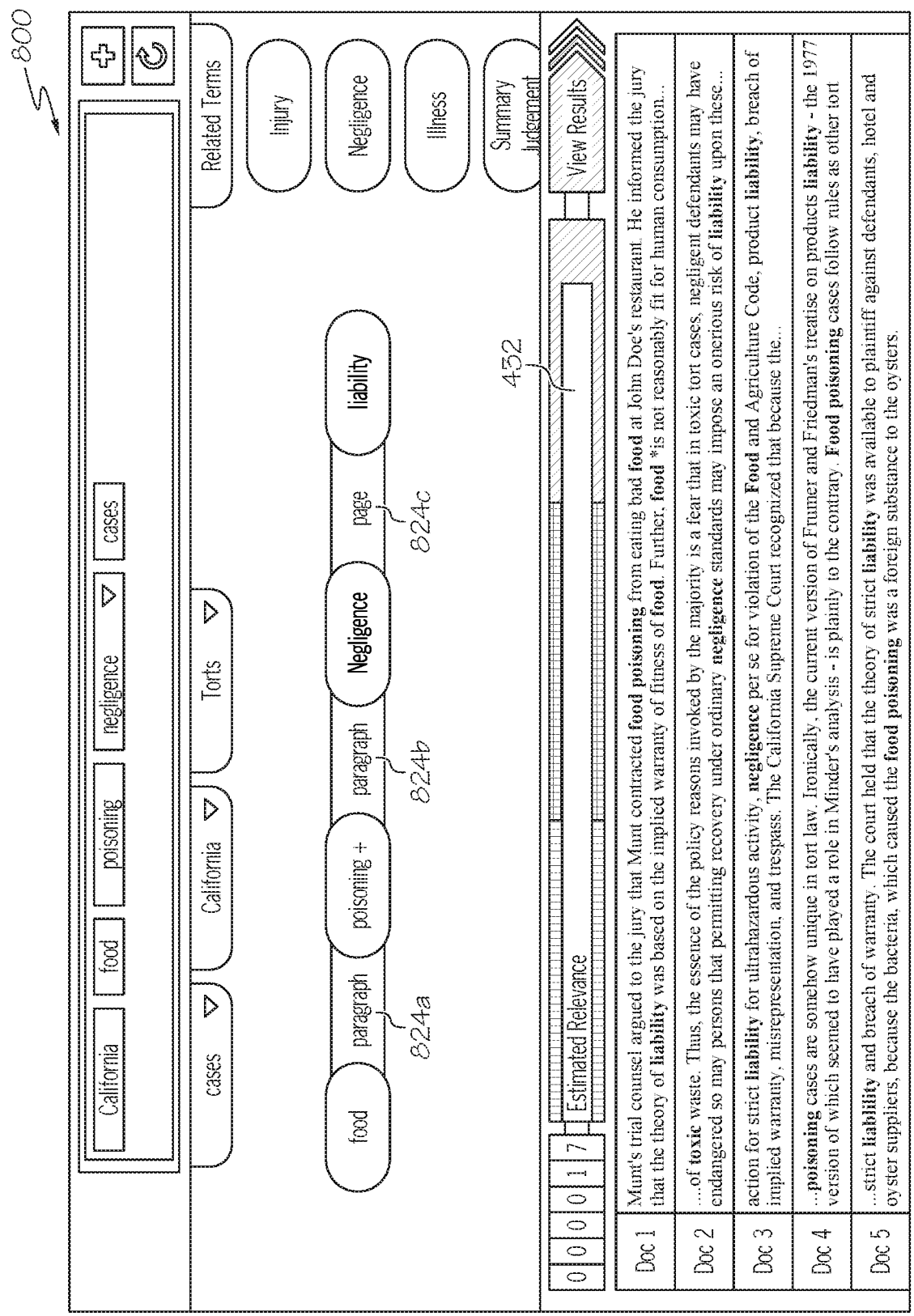
FIG. 8 depicts a schematic illustration of a graphical user interface illustrating a query improved by changing the proximity connectors among query terms and the resulting improvement in estimated relevance, according to one or more embodiments shown and described herein.

Referring now to FIG. 8, as a final improvement to the search query, the user may change the connectors 824*a*, 824*b*, and 824*c*, such that only documents with: (i) "food" within the same paragraph as "poisoning" (and its synonyms and variants); (ii) "poisoning" (and its synonyms and variants) within the same paragraph as "negligence"; and (iii) "negligence" within the same page as "liability" will be included in the result set of documents. The connectors may be changed by clicking on the connector to cycle among various proximity settings, such as sentence, paragraph, page, document, and the like. After changing the connectors as shown in FIG. 8, the server computing device 12*b* may generate an improved search query, search the database to identify an improved result set of documents, calculate an improved estimated relevance score for the improved result set of documents, and update the graphical user interface by updating the results feedback element based on the improved result set of documents, as described above with respect to blocks 306-310. As shown in FIG. 8, the improved estimated relevance score for the result set identified based on the improved search query is still higher, as shown by the updated estimated relevance indicator 432 advancing farther to the right into the high estimated relevance region. The number of results has been narrowed to 17, indicating that the documents of the result set are highly relevant to the search query and much fewer than the initial set of results identified by the initial search query of FIG. 4. A user may now proceed with inspecting the documents in the result set with confidence that relevant results have been identified and that wasted time will be reduced.

Accordingly, it should be understood that embodiments described herein display estimated relevance indicators for result sets of documents based on calculated estimated relevance scores. The displayed estimated relevance indicator provides a useful visual indication of the degree to which the result set of documents are relevant to the search query. Providing a visual indication of the degree to which a result set of document is relevant to a search query may allow a user to formulate improved queries, inspect more relevant documents, and save time by reducing the amount of time spent inspecting irrelevant documents. Furthermore, the graphical user interfaces described herein may facilitate the generation of search queries, the iterative refinement and manipulation of search queries, and the understanding of the estimated relevance of query results in an intuitive and user-friendly manner such that a user may identify desired content and have confidence that the identified content is relevant.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for displaying a visualization of a search query, the method comprising:
   providing for display, by a computer, a graphical user interface having a query input element
   receiving a search query entered into the query input element, wherein the search query includes a plurality of query terms;
   providing for display on the graphical user interface a query visualization and manipulation element including a plurality of nodes and a plurality of connectors, wherein the plurality of nodes correspond to the plurality of query terms, wherein each connector of the plurality of connectors connects a pair of the plurality of nodes and is representative of a proximity of the corresponding query terms of the connected pair of nodes;
   providing for display an estimated relevance element and a results feedback element on the graphical user interface;
   searching a database using the search query to identify the result set of documents, wherein the result set of documents are identified based on the search query;
   calculating an estimated relevance score for the result set of documents, wherein the estimated relevance score is indicative of a degree to which the result set of documents are relevant to the search query;
   updating the results feedback element based on the result set of documents; and
   updating the estimated relevance element to display the estimated relevance indicator based on the estimated relevance score, wherein the estimated relevance indicator provides a visual indication of the degree to which the result set of documents are relevant to the search query.

2. The method of claim 1, further comprising
   determining that the estimated relevance score is less than a relevance score threshold;
   in response to determining that the estimated relevance score is less than the relevance score threshold, updating the query visualization and manipulation element to provide at least one suggestion for improving the search query;
   in response to providing at least one suggestion for improving the search query, receiving a query improvement;

in response to receiving the query improvement, generating an improved search query;

searching the database using the improved search query to identify an improved result set of documents, wherein the improved result set of documents are identified based on the improved search query;

calculating an improved estimated relevance score for the improved result set of documents, wherein the improved estimated relevance score is indicative of a degree to which the improved result set of documents are relevant to the improved search query;

updating the results feedback element based on the improved result set of documents; and updating the estimated relevance element to display an improved estimated relevance indicator based on the improved estimated relevance score, wherein the improved estimated relevance indicator provides a visual indication of the degree to which the improved result set of documents are relevant to the improved search query.

3. The method of claim 1, wherein the estimated relevance indicator is a bar, wherein a length of the bar is indicative of the degree to which the result set of documents are relevant to the search query.

4. The method of claim 1, wherein a color of the estimated relevance indicator is indicative of the degree to which the result set of documents are relevant to the search query.

5. The method of claim 1, wherein the proximity of the corresponding query terms within a portion of a document indicates the degree to which the terms are concentrated within the document versus distributed throughout the document.

6. The method of claim 1, wherein the estimated relevance score is further calculated based on the proximity of query terms for one or more of the documents in the result set.

7. A system for displaying a visualization of a search query, the system comprising:

memory;

a processor coupled to the memory, the processor configured to:

display a graphical user interface having a query input element;

receive a search query entered into the query input element, wherein the search query includes a plurality of query terms;

provide for display on the graphical user interface a query visualization and manipulation element including a plurality of nodes and a plurality of connectors, wherein the plurality of nodes correspond to the plurality of query terms, wherein each connector of the plurality of connectors connects a pair of the plurality of nodes and is representative of a proximity of the corresponding query terms of the connected pair of nodes;

provide for display an estimated relevance element and a results feedback element on the graphical user interface;

search a database using the search query to identify the result set of documents, wherein the result set of documents are identified based on the search query;

calculate an estimated relevance score for the result set of documents, wherein the estimated relevance score is indicative of a degree to which the result set of documents are relevant to the search query;

update the results feedback element based on the result set of documents; and update the estimated relevance element to display the estimated relevance indicator based on the estimated relevance score, wherein the estimated relevance indicator provides a visual indication of the degree to which the result set of documents are relevant to the search query.

8. The system of claim 7, wherein the processor is further configured to:

determine that the estimated relevance score is less than a relevance score threshold;

in response to determining that the estimated relevance score is less than the relevance score threshold, update the query visualization and manipulation element to provide at least one suggestion for improving the search query;

in response to providing at least one suggestion for improving the search query, receive a query improvement;

in response to receiving the query improvement, generate an improved search query;

search the database using the improved search query to identify an improved result set of documents, wherein the improved result set of documents are identified based on the improved search query;

calculate an improved estimated relevance score for the improved result set of documents, wherein the improved estimated relevance score is indicative of a degree to which the improved result set of documents are relevant to the improved search query;

update the results feedback element based on the improved result set of documents; and update the estimated relevance element to display an improved estimated relevance indicator based on the improved estimated relevance score, wherein the improved estimated relevance indicator provides a visual indication of the degree to which the improved result set of documents are relevant to the improved search query.

9. The system of claim 7, wherein the estimated relevance indicator is a bar, wherein a length of the bar is indicative of the degree to which the result set of documents are relevant to the search query.

10. The system of claim 7, wherein a color of the estimated relevance indicator is indicative of the degree to which the result set of documents are relevant to the search query.

11. A non-transitory computer readable medium embodying computer-executable instructions, that when executed by a processor, cause the processor to execute operations for providing for display of a visualization of a search query comprising:

providing for display, by a computer, a graphical user interface having a query input element;

receiving a search query entered into the query input element, wherein the search query includes a plurality of query terms;

providing for display on the graphical user interface a query visualization and manipulation element including a plurality of nodes and a plurality of connectors, wherein the plurality of nodes correspond to the plurality of query terms, wherein each connector of the plurality of connectors connects a pair of the plurality of nodes and is representative of a proximity of the corresponding query terms of the connected pair of nodes;

providing for display an estimated relevance element and a results feedback element on the graphical user interface;

searching a database using the search query to identify the result set of documents, wherein the result set of documents are identified based on the search query;

calculating an estimated relevance score for the result set of documents, wherein the estimated relevance score is indicative of a degree to which the result set of documents are relevant to the search query;

updating the results feedback element based on the result set of documents; and updating the estimated relevance element to display the estimated relevance indicator based on the estimated relevance score, wherein the estimated relevance indicator provides a visual indication of the degree to which the result set of documents are relevant to the search query.

12. The non-transitory computer readable medium of claim 11, further comprising determining that the estimated relevance score is less than a relevance score threshold;

in response to determining that the estimated relevance score is less than the relevance score threshold, updating the query visualization and manipulation element to provide at least one suggestion for improving the search query;

in response to providing at least one suggestion for improving the search query, receiving a query improvement;

in response to receiving the query improvement, generating an improved search query;

searching the database using the improved search query to identify an improved result set of documents, wherein the improved result set of documents are identified based on the improved search query;

calculating an improved estimated relevance score for the improved result set of documents, wherein the improved estimated relevance score is indicative of a degree to which the improved result set of documents are relevant to the improved search query;

updating the results feedback element based on the improved result set of documents; and updating the estimated relevance element to display an improved estimated relevance indicator based on the improved estimated relevance score, wherein the improved estimated relevance indicator provides a visual indication of the degree to which the improved result set of documents are relevant to the improved search query.

13. The non-transitory computer readable medium of claim 11, wherein the estimated relevance indicator is a bar, wherein a length of the bar is indicative of the degree to which the result set of documents are relevant to the search query.

14. The non-transitory computer readable medium of claim 11, wherein a color of the estimated relevance indicator is indicative of the degree to which the result set of documents are relevant to the search query.

* * * * *